No. 684,347. Patented Oct. 8, 1901.
F. A. BROWNELL.
FINDER FOR PHOTOGRAPHIC CAMERAS.
(Application filed Feb. 7, 1901.)
(No Model.)
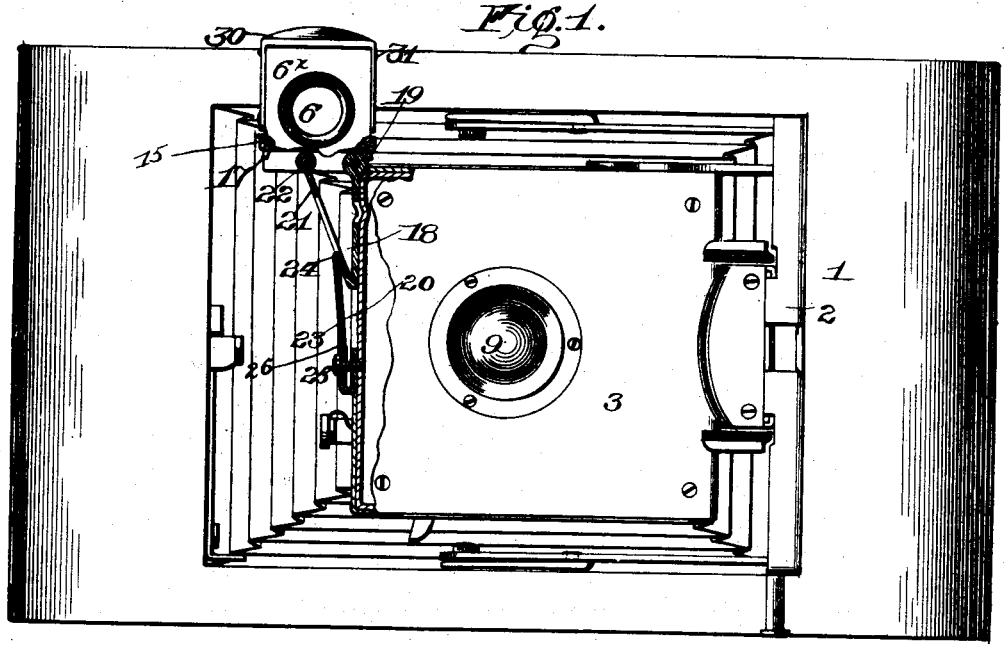
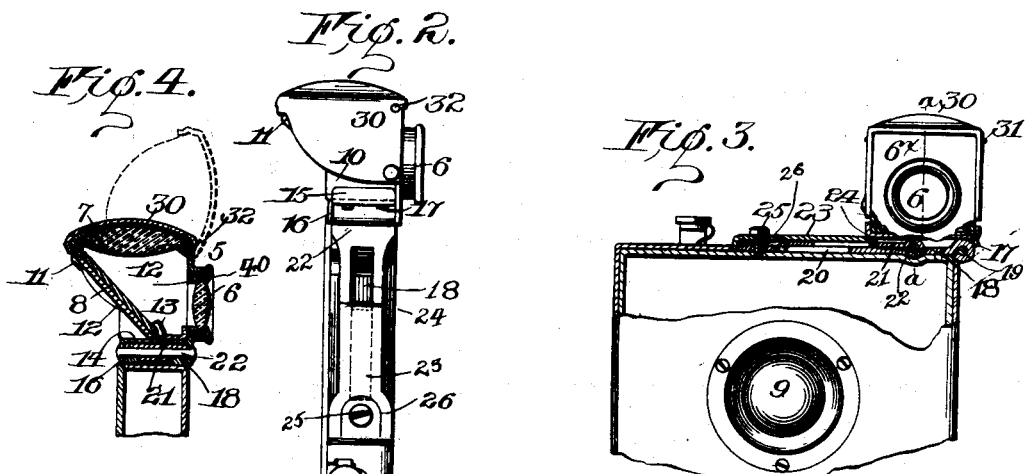
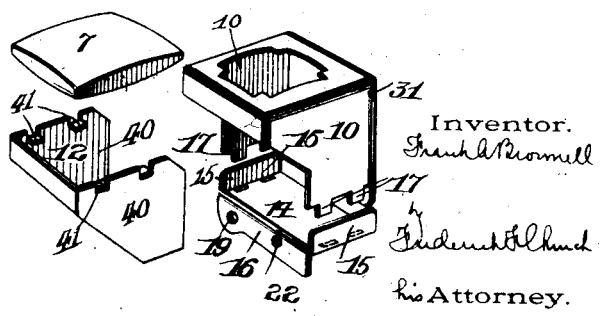
Witnesses.
Walter B. Payne
Elizabeth J. Gary
Inventor.
Frank A. Brownell
by Frederick L. Church
his Attorney.

UNITED STATES PATENT OFFICE.

FRANK A. BROWNELL, OF ROCHESTER, NEW YORK, ASSIGNOR TO EASTMAN KODAK COMPANY, OF SAME PLACE.

FINDER FOR PHOTOGRAPHIC CAMERAS.

SPECIFICATION forming part of Letters Patent No. 684,347, dated October 8, 1901

Original application filed July 25, 1900, Serial No. 24,798. Divided and this application filed February 7, 1901. Serial No. 46,322. (No model.)

*To all whom it may concern:*

Be it known that I, FRANK A. BROWNELL, of Rochester, in the county of Monroe and State of New York, have invented certain new and useful Improvements in Finders for Photographic Cameras; and I do hereby declare the following to be a full, clear, and exact description of the same, reference being had to the accompanying drawings, forming a part of this specification, and to the reference-numerals marked thereon.

My present invention has for its object to provide an improved finder or camera lucida adapted particularly for use on photographic cameras and which may be readily applied to cameras of any desired form and in such manner that it may be used when the camera is in an upright or horizontal position; and to these ends it consists in certain improvements hereinafter described, the novel features being pointed out in the claims at the end of this specification.

In the accompanying drawings, Figure 1 is a front elevation of a photographic camera, showing my improved finder applied thereto, the supporting-arms for the finder being shown in section. Fig. 2 is a plan view of the finder and its support in the position shown in Fig. 1; Fig. 3, a longitudinal sectional view through the finder-support when turned in another position from that shown in Fig. 1; Fig. 4, a sectional view taken on the line $a\ a$ of Fig. 3; Fig. 5, a perspective view of the parts of the finder-casing separated.

Similar reference-numerals in the several figures indicate similar parts.

I have shown the finder constituting my present invention applied to a camera such as is contained in my prior application, Serial No. 24,798, filed July 25, 1900, of which this application is a division, said camera being of the kind adapted to contain rolls of film and embodying a body or casing 1 and a support or door 2, upon which is arranged to move the frame or lens-support 3, said camera being also adapted to be used in either a vertical or horizontal position, in which latter it is shown in Fig. 1 of the drawings.

The finder or camera lucida embodies, as usual, a main casing, open in front and on top, provided with a front lens 6 and upper larger lens 7 and the inclined mirror 8, the axis of the lens 6 being substantially in the plane of the axis of the main lens 9 of the camera to which the device is to be applied, and as usual in finders of this construction there may be substituted for the double convex lens 7 a ground-glass plate.

The main casing of the finder in the present embodiment is composed of a single stamping of metal, as shown in Fig. 5, embodying the front wall $6^\times$ and side walls 10 and having in its upper portion an aperture in which the lens 7 is arranged. The rear upper part of this casing-section is provided with a small downwardly-extending tongue 11, and the bottom and rear inclined wall of the finder is composed of a plate 12, having lugs 13 struck therefrom and adapted to engage the lower edge of the mirror 8, the side portions or wings 40 of said plate being adapted to lie within the side walls of the casing and to be held in position by the tongue or lug 11, which is bent down behind it, as shown in Fig. 4, when the parts are assembled. The lugs 41 on the side wings of the plate 12 coöperate with the lower side of the lens 7 to hold the latter beneath the opening in the upper portion of the casing.

14 indicates a plate arranged at the bottom of the main casing, having the flanges 15 extending upon the sides of the side plates 10 thereof and the downwardly-extending flange 16 at one side and parallel with the lower end of the front part of the casing, as seen in Fig. 4, said plate 14 being secured in position by lugs or ears 17, formed on the side flanges or plates 10 and extending through perforations in said plate 14 and bent laterally, as shown particularly in Fig. 1.

18 indicates a plate or arm constituting the support for the finder and bent over at one end to form an eye for the passage of a pin or rivet 19, extending between the lugs or flanges on the lower side of the finder-casing, said plate being also provided with a longitudinally-extending slot or recess 20 for the reception of the bent end of a slotted link 21, pivoted at 22 to the finder-casing and adapted to move back and forth in said slot when the finder is turned on the pivot 19.

23 indicates an arm constructed of spring metal bearing at one end on the link and preferably provided with a hooked end 24, extending in the slot of the link 21, said plate having its arm bent down at the other end and extending beyond the end of the support or plate 18 and secured in position by a rivet or screw 25, passing through the plate 18 and entering the camera-front or other support to which the finder is to be attached.

In order to make the spring-arm 23 a little more resilient, the latter is cut away at 26 on three sides and around its securing-screw; but this construction is not deemed essential, although it is preferred.

Inasmuch as the finder-casing is pivoted at one of its corners and the support 18 is adapted to be applied to the camera on either edge at one corner thereof, as shown in Fig. 1, it will be seen that the finder can be turned to a vertical or horizontal position on its pivot 19 and will be held securely in either position of adjustment by the spring-arm 23 bearing on the link, said spring operating upon the link to hold the outer free side of the casing uppermost and moved away from the plate 18 in one position, as shown in Fig. 1, this motion being limited by the engagement of the hooked end of the spring with the link and of the hooked end of the link with the plate 18, or either or both, and when the finder is turned down to the position shown in Fig. 3 the pressure of the spring will tend to keep it in this position, preventing its accidental movement.

The finder is preferably provided with a hood or cover 30, pivoted at 31 to the forward edge of the casing by a rod or pin 32, so as to enable the operator to more readily observe the image thrown upon the mirror and reflected upward.

The finder as a whole is attractive in appearance and may be readily applied to any camera or other structure, but is particularly adapted to cameras of that class in which the lens-support is movable within a recess formed in the camera-casing proper, as the holding devices for the finder are of such nature that they prevent its movement outward to a position which would prevent the camera-front from moving within the casing.

I claim as my invention—

1. The combination with a support, of a finder pivoted thereto, a link pivoted to the finder, and a spring operating on the link to hold the finder in two positions when moved on its pivot.

2. The combination with a finder, of the supporting-plate to which the finder is pivoted, the link pivoted to the finder and engaging the plate, and the spring on the plate operating on the link laterally of its pivot to hold the finder in two positions of adjustment.

3. The combination with a finder, the supporting-plate upon which the finder is pivoted, the link pivoted to the finder and sliding upon the plate, and the spring on the plate operating upon the link intermediate its ends to hold the finder in two positions of adjustment on its pivot.

4. The combination with the supporting-plate having the slot, the finder pivoted on the plate at one corner, the link pivoted to the finder and having the lug operating in the slot in the plate, and the spring operating on the link intermediate its ends to hold the finder in two positions of adjustment on its pivot.

5. The combination with the finder having the flanges, the supporting-plate having the eye at its end, and the pivot connecting them, of a link connecting the finder and plate and movable upon one of the parts to limit the movement of the former in one direction on its pivot.

6. The combination with a support, of a finder pivoted to the support, and a link pivoted to the finder and sliding upon and engaging the support to limit the movement of the finder.

7. The combination with a support, of a finder pivoted thereon, the slotted link pivoted to the finder and sliding upon the support at one end, and the spring secured to the support having the projection at the end operating in the slot in the link.

8. In a finder, the combination with the casing-section embodying the integral perforated top and front and the side flanges, of the inclined back plate, the mirror thereon and the lens in the front of the casing.

9. In a finder, the combination with the casing-section embodying the integral perforated top and front and the side flanges, of the inclined back plate, the mirror thereon, the bottom plate having the flange, the support, the pivot engaging the front, and the flange on the bottom plate and journaled in the support.

FRANK A. BROWNELL.

Witnesses:
JOHN E. LENAHAN,
F. F. CHURCH.